United States Patent Office 3,502,862
Patented Mar. 24, 1970

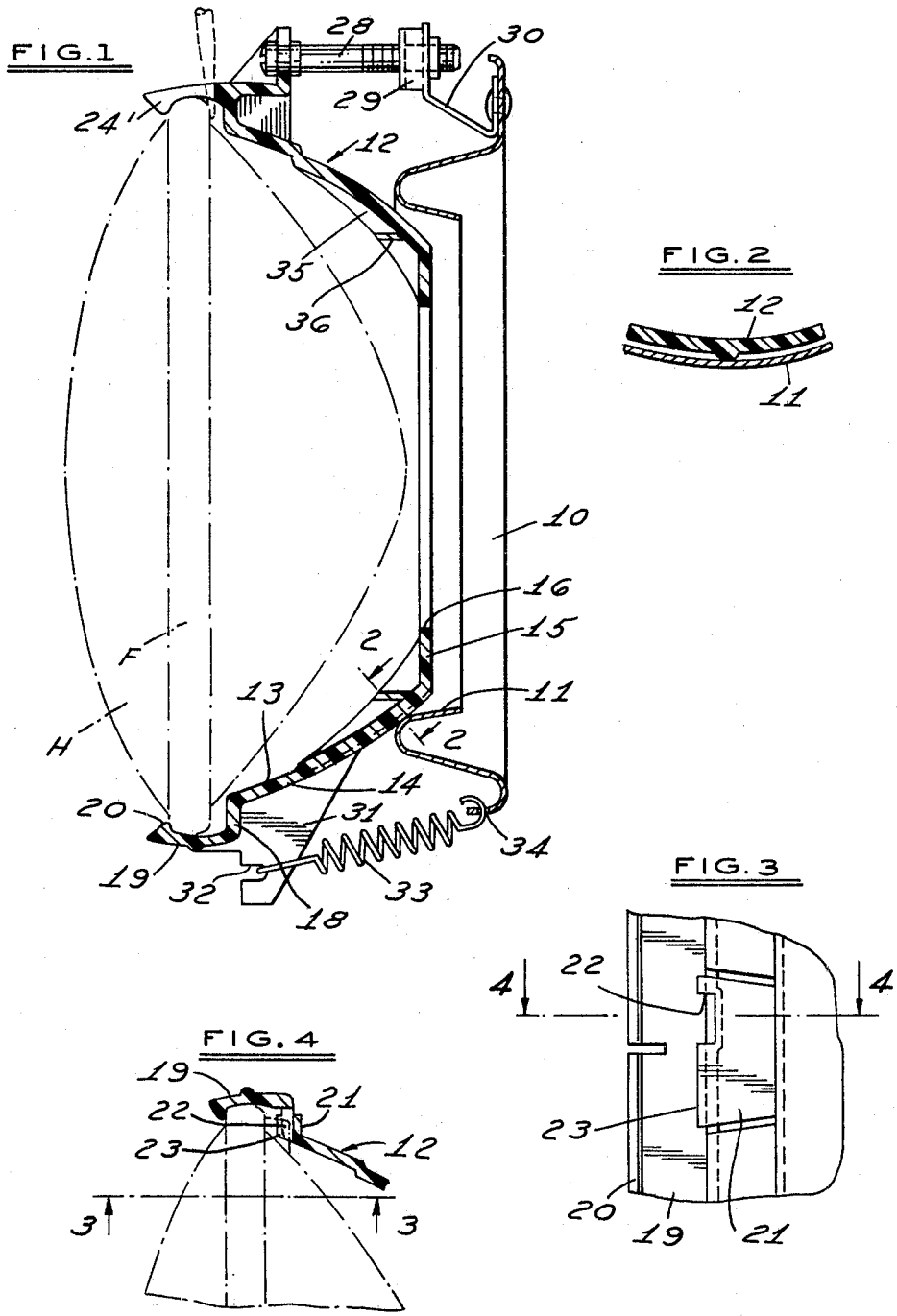

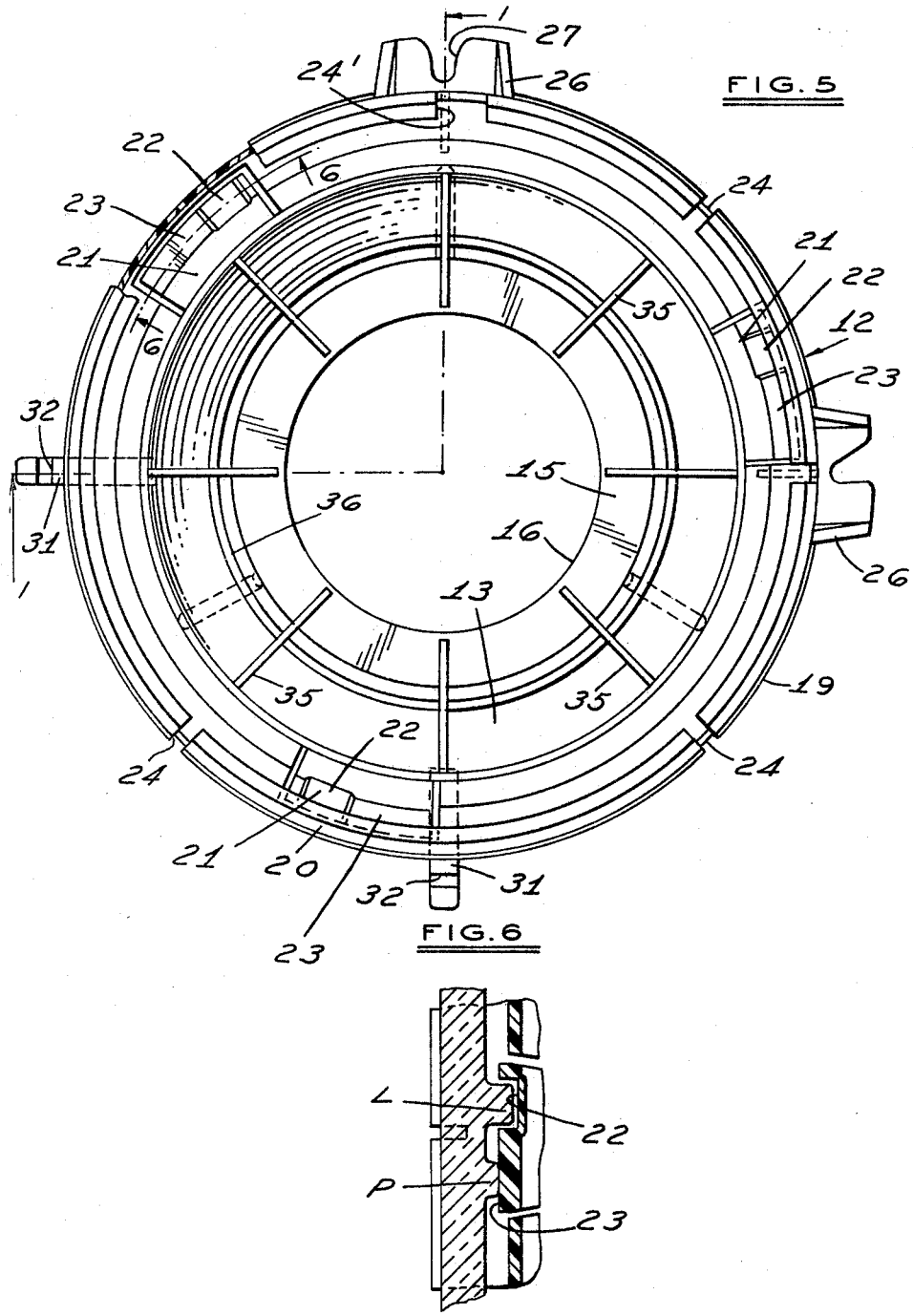

3,502,862
MOUNTING OF SEALED BEAM HEADLAMPS
Peter Hedgewick, Windsor, Ontario, Canada, and Jay E. White, Jr., Bloomfield Hills, Mich., assignors to Reflex Corporation of Canada Limited, Amherstburg, Ontario, Canada, a corporation of Ontario
Filed June 29, 1967, Ser. No. 649,914
Int. Cl. F21v 17/00, 7/00
U.S. Cl. 240—41.5                     31 Claims

ABSTRACT OF THE DISCLOSURE

An automobile adjustable headlamp mounting having a one-piece plastic housing comprising a relatively thin annular spherical wall with a frusto-spherical inner surface and a frusto-spherical outer surface for engaging an opening in a mounting bracket. A peripheral rim on the annular wall has a radially inwardly extending bead for engaging the flange of a sealed beam headlamp. The housing has integral spring tabs on the wall radially inwardly of the rim for engaging the flange of the headlamp to hold the latter in the housing between the bead and the spring tabs. Circumferentially positioned integral mounting brackets are located on the annular wall.

---

This invention relates to the mounting of sealed beam headlamps.

Background of the invention

In the mounting of sealed beam headlamps on automobiles, it is conventional to utilize a three-piece mounting which includes a fixed bracket on the automobile, an adjustable bracket, which is mounted on the fixed bracket and has recesses for engaging the locating lugs on the flange of the sealed beam headlamp and surfaces for engaging the positioning surfaces on the flange of the headlamp, and a retaining flange that is provided on the exterior of the headlamp to hold the headlamp against the adjustable bracket.

Among the objects of the present invention are to provide a mounting for headlamps which incorporates only two pieces, a fixed bracket on the automobile and a single one-piece plastic housing; which effectively holds the sealed beam headlamp on the automobile; which is low in cost; which is accurate in its retention of the sealed beam headlamp; and which does not interfere with the appearance of the automobile.

Summary

As disclosed herein, an annular bracket having a circular opening therein is mounted on the automobile and a one-piece plastic housing is, in turn, adjustably mounted on the bracket. The one-piece plastic housing comprises a thin annular generally spherical wall which has axial extending ribs on the outer surface thereof engaging the sides of the opening in the bracket. The housing includes flanges through which bolts extend for adjustably mounting the housing on the bracket and springs extend between the housing and the bracket to hold the housing in position on the bracket. The housing has an annular peripheral wall with a radially inwardly extending rib that engages the outer surface of the flange on the sealed beam headlamp. The housing also includes integral spring tabs that engage the axially inner surface of the flange on the sealed beam headlamp so that the sealed beam headlamp is supported within the housing. Each spring tab is provided with a recess for engaging the locating lug on the flange of the sealed beam headlamp and a pad for engaging the complementary surface on the flange of the sealed beam headlamp. The peripheral rim of the housing is slotted and one of the slots is made sufficiently wide to permit insertion of a tool such as a screwdriver to permit prying of the sealed beam headlamp out of the housing.

Description of the drawings

FIG. 1 is a longitudinal sectional view through a mounting of the headlamp.
FIG. 2 is a fragmentary sectional view taken along the line 2—2 in FIG. 1.
FIG. 3 is a fragmentary sectional view taken along the line 3—3 in FIG. 4.
FIG. 4 is a fragmentary sectional view taken along the line 4—4 in FIG. 3.
FIG. 5 is a part sectional plan view of a portion of the mounting shown in FIG. 1.
FIG. 6 is a fragmentary sectional view taken along the line 6—6 in FIG. 5 showing the sealed beam headlamp in position.

Description

Referring to FIG. 1, the mounting for the headlamp embodying the invention comprises a bracket 10 which may be the conventional bracket that forms a part of the automobile and includes a circular opening 11 defined by an inwardly bent portion of the sheet metal. In accordance with the invention, a one-piece plastic housing 12 is mounted on the bracket 10. A satisfactory material for the housing comprises polypropylene.

Housing 12 includes a thin spherical annular wall 13 that has frusto-spherical inner and outer surfaces 13, 14. One end of the housing 12 is formed with a radially inwardly extending flange 15 that defines an opening 16.

At the other end of the wall 13, there is provided a radially outwardly extending flange 18 and a peripheral annular wall 19. Annular wall 19 is formed with a radially inwardly extending rib 20 that is adapted to engage over the outer surface of the flange F on the sealed beam headlamp H.

As shown in FIGS. 1–6, the side wall of the housing 12 is slotted to define cantilever mounted spring tabs 21 which at their outer end are formed with recesses 22 and load bearing surface 23. As is well known, the headlamp H is provided with circumferentially spaced locating lugs L and bearing pads P (FIG. 6). In accordance with the invention, the locating lugs L extend into the recesses to circumferentially locate the headlamp while the pads P bear against the surfaces 23 to support the headlamp. Thus, the headlamp is held between the bead 20 and the surfaces 23.

As shown in FIG. 5, the peripheral wall 19 is slotted as at 24 at circumferentially spaced points to provide segments that will more readily snap over the flange F of the headlamp. In addition, mounting flanges 26 extend radially outwardly from the flange 18 and have slots 27 for engaging the head of a flanged screw 28 that is threaded into a nut 29 fixed on a tab 30 which, in turn, is fixed to the bracket 10. Such an arrangement is provided at two circumferentially spaced points. At points diametrically opposed from the flanges 26, integral axial walls 31 having slots 32 are provided for receiving one end of a spring 33 which has its other end extending through an opening 34 in the bracket 10 to yieldingly hold the housing against the bracket. By threading the screws 28 inwardly and outwardly, the housing 12 and, in turn, the sealed beam headlamp mounted therein can be aimed.

As further shown in FIGS. 1 and 5, axially extending walls 35 are provided at circumferentially spaced points along the inner surface of the housing 12 and extend from a point beneath the flange 18 to the flange 15 and thereby provide rigidity to the housing. The housing is further rigidified by a cylindrical wall 36 that interconnects the walls 35 at the area of juncture of the annular wall 13 and flange 15.

One of the slots 24' is made wider than the remainder of the slots to permit insertion of a tool, such as a screwdriver, for prying the headlamp and removing it from the housing.

It can thus be seen that there has been provided a mounting for a headlamp which utilizes a minimum number of parts, can be manufactured at low cost, and effectively supports the headlamp.

We claim:

1. The combination comprising
   a bracket,
   said bracket having a recess therein defining an opening,
   a one-piece plastic housing comprising an annular wall engaging said opening in said bracket,
   a peripheral rim on said annular wall,
   said rim having radially inwardly extending bead portions for engaging the flange of a sealed beam headlamp,
   said housing having integral spring tabs thereon for engaging the flange of a sealed beam headlamp to hold said headlamp in said housing between said bead portions and said spring tabs,
   circumferentially positioned integral brackets on said housing,
   means extending between said flanges and one said bracket for adjustably supporting said housing on said bracket, and
   spring means extending between said housing and another said bracket for yieldingly urging said housing against said bracket.

2. The combination set forth in claim 1 wherein said integral spring tabs are defined by slots in the wall of said housing.

3. The combination set forth in claim 2 wherein said integral spring tabs extend in cantilever fashion from said wall.

4. The combination set forth in claim 1 wherein said integral spring tabs have recesses therein for receiving the locating lugs on the flange of a sealed beam headlamp.

5. The combination set forth in claim 1 wherein said integral spring tabs have surfaces thereon for engaging the locating pads which are formed on the sealed beam headlamp.

6. The combination set forth in claim 1 wherein said wall includes generally axially extending ribs on the exterior thereof engaging the sides of said bracket.

7. The combination set forth in claim 1 wherein said housing includes generally axially extending walls circumferentially spaced along the interior surface of said annular wall.

8. The combination set forth in claim 7 wherein said housing includes a generally annular wall interconnecting said last mentioned walls about the axis of said annular wall.

9. The combination set forth in claim 1 wherein the peripheral rim is slotted.

10. The combination set forth in claim 1 wherein said peripheral rim has a slot therein to permit the insertion of a tool beneath the flange of the sealed beam headlamp to permit prying of the headlamp out of the housing.

11. The combination comprising
    a one-piece plastic housing comprising an annular wall adapted to extend into an opening in a bracket,
    a peripheral rim on said annular wall,
    said rim having radially inwardly extending bead portions for engaging the flange of a sealed beam headlamp,
    said housing having integral spring tabs on said wall radially inwardly of said rim for engaging the flange of a sealed beam headlamp to hold said headlamp in said housing between said bead portions and said spring tabs,
    circumferentially positioned integral mounting brackets on said housing.

12. The combination set forth in claim 11 wherein said integral spring tabs are defined by slots in the annular wall of said housing.

13. The combination set forth in claim 12 wherein said integral spring tabs extend in cantilever fashion from said annular wall.

14. The combination set forth in claim 11 wherein said integral spring tabs have recesses therein for receiving the locating lugs on the flange of a sealed beam headlamp.

15. The combination set forth in claim 12 wherein said integral spring tabs have surfaces thereon for engaging the locating pads which are formed on the sealed beam headlamp.

16. The combination set forth in claim 11 wherein said annular wall includes generally axially extending ribs on the exterior thereof engaging the sides of said bracket.

17. The combination comprising
    a one-piece plastic housing comprising an annular wall adapted to extend into an opening in a bracket,
    a peripheral rim on said annular wall,
    said rim having a radially inwardly extending bead for engaging the flange of a sealed beam headlamp,
    said housing having integral spring tabs thereon for engaging the flange of a sealed beam headlamp to hold said headlamp in said housing between said bead and said spring tabs,
    circumferentially extending integral mounting brackets on said housing,
    said housing including generally axially extending walls circumferentially spaced along the interior surface of said annular wall.

18. The combination set forth in claim 17 wherein said housing includes a generally annular wall interconnecting said last mentioned walls about the axis of said annular wall.

19. The combination set forth in claim 11 wherein the peripheral rim is slotted.

20. The combination set forth in claim 11 wherein said peripheral rim has a slot therein to permit the insertion of a tool beneath the flange of the sealed beam headlamp to permit prying of the headlamp out of the housing.

21. The combination comprising
    a one-piece plastic housing comprising a relatively thin annular spherical wall having a frusto-spherical inner surface and a frusto-spherical outer surface for engaging an opening in a mounting bracket,
    a peripheral rim on said annular wall,
    said rim having a radially inwardly extending bead for engaging the flange of a sealed beam headlamp,
    said housing having integral spring tabs on said wall radially inwardly of said rim for engaging the flange of the sealed beam headlamp to hold said headlamp in said housing between said bead and said spring tabs,
    circumferentially positioned integral mounting brackets on said annular wall.

22. The combination set forth in claim 21 wherein said integral spring tabs are defined by slots in the annular wall of said housing.

23. The combination set forth in claim 22 wherein said integral spring tabs extend in cantilever fashion from said annular wall.

24. The combination set forth in claim 21 wherein said integral spring tab has recesses therein for receiving the locating lugs on the flange of a sealed beam headlamp.

25. The combination set forth in claim 24 wherein said integral spring tabs have surfaces thereon for engaging the locating pads which are formed on the sealed beam headlamp.

26. The combination set forth in claim 21 wherein said annular wall includes generally axially extending ribs on the exterior thereof engaging the sides of an opening in a mounting bracket.

27. The combination comprising
a one-piece plastic housing comprising a relatively thin annular spherical wall having a frusto-spherical inner surface and a frusto-spherical outer surface for engaging an opening in a mounting bracket,
a peripheral rim on said annular wall,
said rim having a radially inwardly extending bead for engaging the flange of a sealed beam headlamp,
said housing having integral spring tabs thereon for engaging the flange of the sealed beam headlamp to hold said headlamp in said housing between said bead and said spring tabs,
circumferentially extending integral mounting brackets on said annular wall,
said housing including generally axially extending walls circumferentially spaced along the interior surface of said annular wall.

28. The combination set forth in claim 27 wherein said housing includes a generally annular wall interconnecting said last mentioned walls about the axis of said annular wall.

29. The combination set forth in claim 21 wherein the peripheral rim is slotted.

30. The combination set forth in claim 21 wherein said peripheral rim has a slot therein to permit the insertion of a tool beneath the flange of the sealed beam headlamp to permit prying of the headlamp out of the housing.

31. The combination comprising
a housing comprising an annular wall adapted to extend into an opening in a bracket,
a peripheral rim on said annular wall,
said rim having radially inwardly extending bead portions for engaging the flange of a sealed beam headlamp,
said housing having integral spring tabs on said wall radially inwardly of said rim for engaging the flange of a sealed beam headlamp to hold said headlamp in said housing between said bead portions and said spring tabs,
circumferentially positioned integral mounting brackets on said housing.

References Cited

UNITED STATES PATENTS

| | | | |
|---|---|---|---|
| 2,868,961 | 1/1959 | Worden | 240—41.5 |
| 2,910,577 | 10/1959 | Bolmeyer | 240—41.6 |
| 3,280,323 | 10/1966 | Pawlowski | 240—41.6 |

FOREIGN PATENTS 160,219    8/1957    Sweden.

NORTON ANSHER, Primary Examiner

R. A. WINTERCORN, Assistant Examiner

U.S. Cl. X.R.

240—41.6